United States Patent [19]

Kreis et al.

[11] Patent Number: 5,385,383
[45] Date of Patent: Jan. 31, 1995

[54] DOOR PILLAR FOR PASSENGER CAR COACHWORK

[75] Inventors: Gundolf Kreis, Oberstimm; Norbert Enning, Denkendorf; Ulrich Klages; Heinrich Timm, both of Ingolstadt, all of Germany

[73] Assignee: Audi A.G., Ingolstadt, Germany

[21] Appl. No.: 30,299

[22] PCT Filed: Nov. 29, 1991

[86] PCT No.: PCT/EP91/02262

§ 371 Date: Mar. 26, 1993

§ 102(e) Date: Mar. 26, 1993

[87] PCT Pub. No.: WO92/11156

PCT Pub. Date: Jul. 9, 1992

[30] Foreign Application Priority Data

Dec. 20, 1990 [DE] Germany .............. 4041021

[51] Int. Cl.⁶ ............................................. B60J 5/04
[52] U.S. Cl. ................................. 296/202; 296/146.11; 49/381; 16/249
[58] Field of Search .................... 296/202, 146.11; 49/502, 381; 16/249, 243, 252

[56] References Cited

U.S. PATENT DOCUMENTS

| | | | |
|---|---|---|---|
| 959,001 | 5/1910 | Tritsch | 16/243 |
| 1,686,897 | 10/1928 | Carlson | 296/202 |
| 1,842,539 | 1/1932 | Carlson | 49/502 X |
| 2,122,007 | 6/1938 | Kearney | 16/252 |
| 4,652,043 | 3/1987 | Hurlburt | 296/146.11 X |
| 4,881,296 | 11/1989 | Marinoni | 16/249 X |
| 5,094,504 | 3/1992 | Wurl | 296/202 X |

FOREIGN PATENT DOCUMENTS

| | | |
|---|---|---|
| 0267152 | 5/1988 | European Pat. Off. . |
| 0146716 | 12/1988 | European Pat. Off. . |
| 0064879 | 1/1972 | France . |
| 2597056 | 10/1987 | France . |
| 0156522 | 9/1982 | Germany . |
| 3344180 | 6/1985 | Germany . |
| 9004280 | 10/1990 | Germany . |
| 411594 | 11/1966 | Switzerland . |
| 983414 | 2/1965 | United Kingdom ............ 16/243 |

Primary Examiner—David M. Mitchell
Assistant Examiner—Gary C. Hoge
Attorney, Agent, or Firm—Jacques M. Dulin

[57] ABSTRACT

An improved door pillar assembly for a passenger car coachwork formed as a substantially vertical extruded light metal hollow-section member and having an outer wall to which longitudinally spaced upper and lower hinge lugs are adjustably secured for swivel connection of a vehicle door. The extruded hollow section member includes a pair of inner transverse ridge members which extend along the longitudinal dimension and divide the hollow interior into three transversely spaced cage sections. Each of the outer cage sections further includes a longitudinal channel formed into the inner surface of the common wall to which the hinge lugs are adjustably secured. An upper and lower pair of slots are provided in the outer wall and are aligned with respect to the channels for receiving the mounting hardware (i.e., bolts) for the hinge lugs whereby the hinge lugs can be selectively positioned within the slots prior to tightening to provide a desired height adjustment. The slots are sufficiently wide to permit a desired range of transverse adjustability for each hinge lug. The hinge pin support arms of each of the upper and lower hinge lugs are transversely offset from one another such that the hinge pin may be easily positioned at a desired oblique angle with respect to the longitudinal axis of the door pillar to ensure proper fit of the vehicle door.

20 Claims, 2 Drawing Sheets

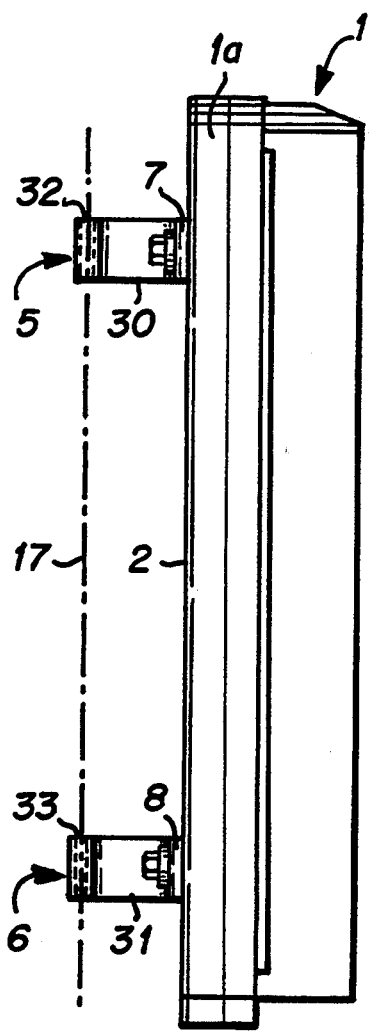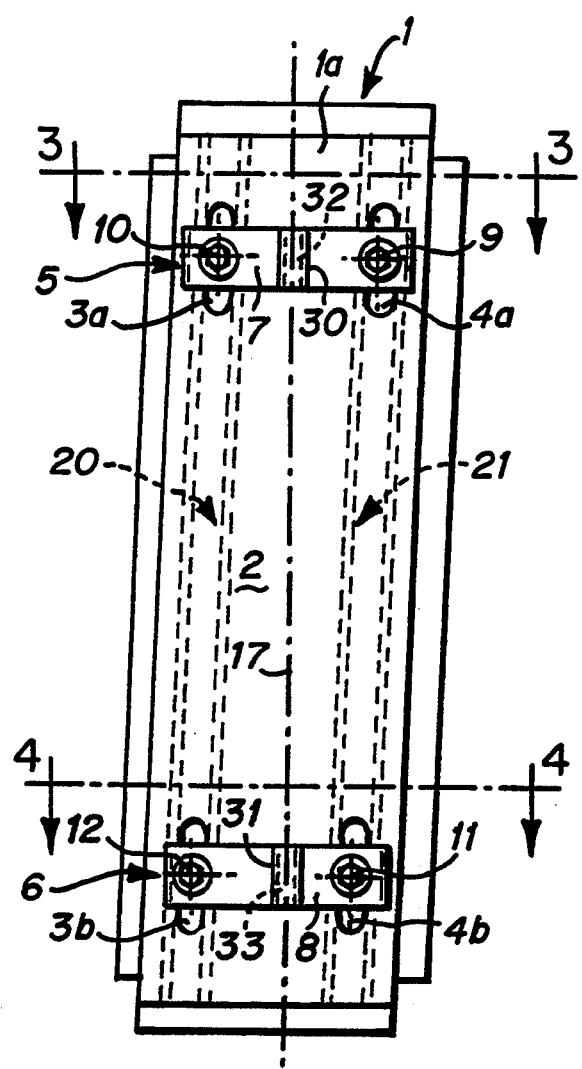
Fig_1  Fig_2

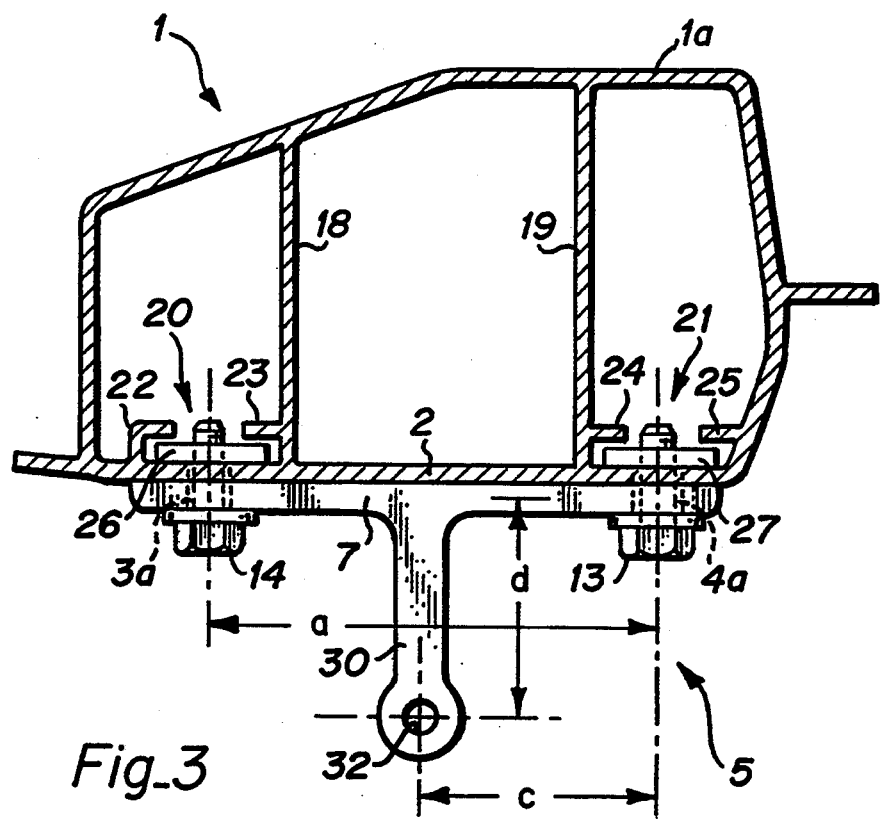
Fig_3
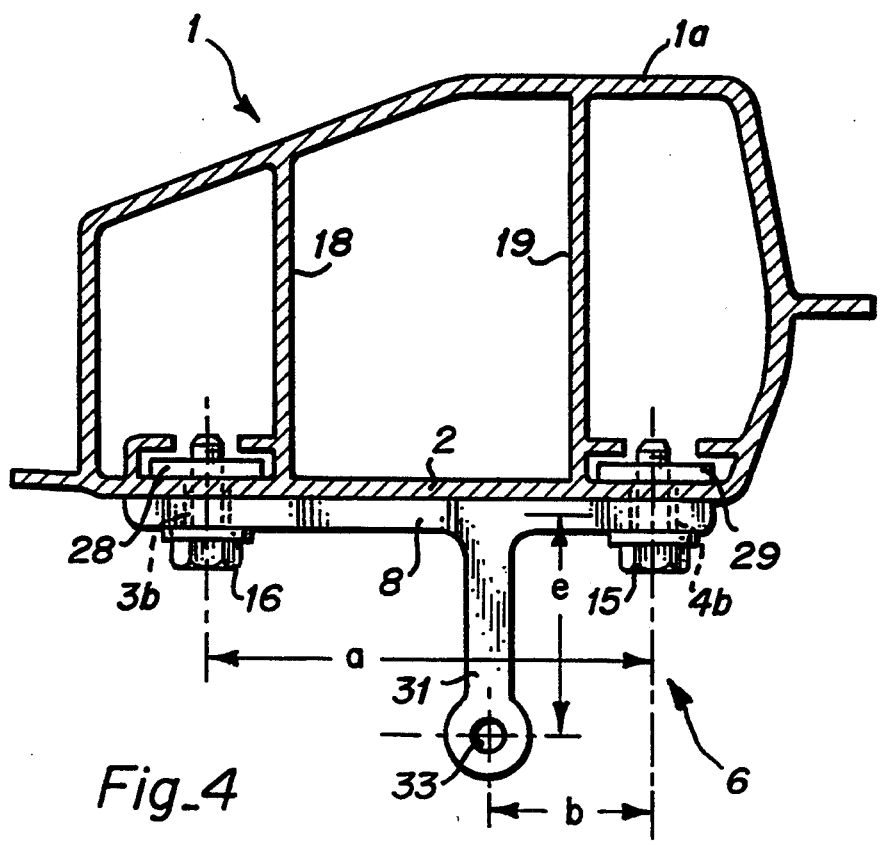
Fig_4

DOOR PILLAR FOR PASSENGER CAR COACHWORK

SPECIFICATION

1. Field

The invention relates generally to motor vehicle body construction and more particularly, the invention relates to an improved hollow section door pillar support structure in a motor vehicle body which is formed from extruded light metal components.

2. Background

In the typical modern day passenger car of the type having a self-supporting coachwork, the coachwork, including all of its supporting structural members, is made from sheet metal parts. Also, to improve rigidity, the supporting structural members are preferably formed as hollow section members and are made from two deep-drawn metal sheets which are welded together. Typically, the hollow section members comprise the main load bearing frame members such as the center pillars, bottom sill members, etc. Such hollow section members are also used as front door pillars, on which hinges are mounted for swivel connection of the vehicle doors.

In the particular the example of the hinge-connected door pillar, the parts of the hinge must be carefully adjusted at the time of assembly to ensure a proper fit of the car door within the cutout opening in the vehicle body. By the term "proper fit", it is meant that the door is in alignment with the outer vehicle body contour and that there is a uniform peripheral gap between the cutout opening and the door's perimeter edge. A properly fitted door must also exhibit a smooth swivel action. There are a number of generally known techniques which are used during the assembly procedure to accomplish the desired fit, such as for example, bending the hinge lugs, use of slot connections, use of ball hinges, etc. Typically, these fitting techniques require additional specialized adjustment devices which can make the adjustment work time consuming and labor intensive.

The metal sheets used to construct the self-supporting car bodies as described above are formed by deep drawing. While the dies used for forming the sheet metal into the desired configurations are relatively costly, they do provide for a very high production rate and therefore offer a cost-favorable solution for large series production of motor vehicles. However, due to the high cost of tooling, this technique is very cost-intensive for a small series production.

Accordingly, and with particular regard to overcoming the high cost consideration for small series production, a solution for an alternative car body fabrication technique is known whereby the hollow section members of the supporting structure of the vehicle coachwork are joined together by means of nodal connector elements. Such a technique is known, for example, from European patent document EP 146 716, wherein the hollow section members are formed from light metal extruded sections, most notably aluminum alloys, and the nodal elements are in the form of light metal castings. Besides achieving a more cost-favorable solution for small production runs, additional benefits of such an aluminum frame design include an overall lighter weight bodywork and an improved resistance to corrosion.

In the embodiment of the invention specifically illustrated in European patent document EP 0 146 716, the front door pillar is shown and described as a simple rectangular-section light metal extruded member. This patent document, however, does not specifically address the above described vehicle door fitting and alignment problems nor does it teach or suggest a solution for mounting the vehicle door to the front door pillar in a simple, cost-effective manner.

Accordingly, there is a definite need in the art for an improved door pillar construction of the generic type which facilitates swivel mounting and adjustment of a vehicle door in an easy and cost-favorable manner.

THE INVENTION

Objects

It is a principle of the present invention to provide an improved door pillar assembly which includes an extruded light metal, hollow-bodied, front door pillar construction of a generic type useful in small series production of motor vehicle coachworks and having channels with slot-like holes formed along an inside wall for adjustably retaining the bolt heads associated with the door hinge lugs, and wherein the channels facilitate swivel mounting and positioning adjustment of the vehicle door to the front door pillar in a simple and cost-effective manner.

It is another object of the present invention to provide each door hinge lug with a door axle support arm of differing extension lengths and transverse spacings relative to the contour of the pillar to permit orientation of the hinge pin at a desired oblique angle with respect to the pillar longitudinal axis.

Other and further objects of the invention will become evident from the following written description, drawings and the appended claims.

Drawings

FIG. 1 is a side view of the improved door pillar construction of the present invention.

FIG. 2 is a front view of the door pillar illustrated in FIG. 1.

FIG. 3 is a cross section view of the door pillar taken along the line and in the direction of arrows A—A of FIG. 2. FIG. 3 illustrates the detail of the upper hinge lug 5.

FIG. 4 is a cross section view similar to FIG. 3 of the door pillar taken along the line and in the direction of arrows B—B of FIG. 2. FIG. 4 illustrates the detail of the lower hinge lug 6.

Summary

The improved door pillar assembly of the present invention comprises an extruded light metal, hollow-section, member which is generally rectangular in cross section and includes at least two lengthwise channels disposed transversely spaced apart along one inner wall. The channel members form cage sections sized to accommodate the nuts of bolt fasteners which are used to connect a pair of door hinge lugs to the outer wall adjacent thereto. Furthermore, holes are provided in the outer wall at the height of the hinge lugs and which are aligned with the cage sections for receiving the mounting hardware (i.e., bolt fasteners). Each hinge lug includes a base plate portion provided with a pair of boreholes having the same transverse spacing as the cage section spacing in the door pillar.

The base plates are secured to the outer wall by means of the fasteners. The width and depth dimension of the cage sections are appropriately sized to hold cage nuts or the bolt heads of the fasteners such that lengthwise positioning of the bolt heads is permitted but twist or rotational movement is not. This feature greatly facilitates the assembly process, which can now be completed as early as the production of the extruded section, with no further workmanship required. An additional advantage of the cage sections is that the channel walls act as stiffeners for the hollow section.

In the preferred embodiment, the holes in the outer wall for the cage sections are formed as slots, each slot having a length dimension sufficient to provide a desired range of simple height adjustment for the hinge lugs. Further, the slots preferably have a width dimension slightly larger than the bolt diameter of the fasteners in order to permit transverse adjustment along the slots in addition to vertical height adjustment. Thus, when a bearing surface of an appropriate width is used, it is also possible to make adjustments transverse to the outer contour of the vehicle body.

The side walls of each channel of the cage sections are formed by lengthwise ridges which have inward facing hook shape ends as seen in cross section, so that each cage section has an opening defining a lengthwise gap which faces inward of the hollow section. Cage nuts can be held and prevented from twisting in such a channel, and the lengthwise gap provides room on the inside of the hollow section for receiving the inwardly protruding screw bolts.

A plurality of transverse ridges, preferably two, are provided in the hollow section in order to achieve the requisite load-supporting capacity for the front door pillar, especially during a crash. In the preferred embodiment, at least one upstanding channel side wall of each cage section forms a portion of one of the transverse ridges.

In view of the manufacturing process, the cage sections which accommodate the nuts used for mounting the hinge lugs are adjustable in the lengthwise direction of the door pillar. As is well known, the position of the door pillar, typically a slightly oblique position, is dictated by a multitude of requirements, for example, stiffness requirements, crash requirements, door turn-in room, ease of entry, and so forth. Therefore, depending on the circumstances, the advisable position of the door hinge axis generally does not coincide with the contour of the door pillar.

Accordingly, it is proposed to enable adjustment, in easy fashion, to a position of the hinge axis which is different from the contour of the extruded section. To accomplish this, different hinge lugs are used for the upper and lower hinged supports. The upper and lower hinge lugs are different in that they have offsetting support arms, each provided with a bore hole for carrying a hinge bolt. The support arm of the first upper hinge lug is situated at one transverse distance from the line of the extruded section contour, and the support arm of the second, lower hinge lug is situated at a second, different, transverse distance from the line of the contour. The resulting hinge axis lies obliquely to the line of the contour.

The positioning flexibility afforded by the length and width dimensions of each slot in combination with the offsetting support arms of the hinge lugs easily compensate for the slight offset of the door hinge arms and vehicle body contour typically found in most prior art vehicle body designs. This combination also permits quick and easy door adjustment without the usual bending and tweaking of the hinge lugs.

The hinge axis may also be arranged obliquely with respect to the line of the outer wall if desired in order to compensate for the differing lengths of the support arms of the two hinge lugs. In order to ensure a smooth swivel action of the vehicle door, the hinge bolts or the bolt recesses are preferably lined up on the hinge axis, the position of which is dictated by the various arrangements of the hinge lugs, and not on the line of the body profile as is done in the usual case in the prior art designs.

Detailed Description of the Best Mode

The following detailed description illustrates the invention by way of example, not by way of limitation of the principles of the invention. This description will clearly enable one skilled in the art to make and use the invention, and describes several embodiments, adaptations, variations, alternatives and uses of the invention, including what we presently believe is the best mode of carrying out the invention.

FIGS. 1 and 2 show a side and a front view of a door pillar assembly 1 constructed in accordance with one embodiment of the present invention. The door pillar 1a is fashioned as an extruded light metal hollow-section member. Longitudinal slots 3a and 4a spaced at a transverse distance to one another are provided in one outer wall 2 and are positioned at a height along the door pillar 1a to receive the mounting hardware for the upper hinge lug 5. In similar fashion, transversely spaced apart, slots 3b and 4b are provided to the lower end of the door pillar to receive the mounting hardware for lower hinge lug 6.

Each hinge lug 5 and 6 is provided with a base plate 7 and 8, including boreholes 9, 10 and 11, 12, respectively, situated at the transverse spacing of the respective slot pairs 3a, 4a and 3b, 4b.

With reference to FIGS. 3 and 4, fasteners 13, 14 and 15, 16 are provided for engaging the slot pairs 3a, 4a and 3b, 4b through the boreholes 9, 10 and 11, 12, whereby the hinge lugs 5, 6 can be shifted and adjusted at differing heights prior to tightening and then locked in place by tightening.

As is best seen in FIG. 2, the door pillar 1a is tilted to the right, while the hinge axis 17, defined as the dashed line intersecting the hinge lugs 5 and 6, is substantially vertical and thus forms an acute angle with the line of the door pillar 1a or the line of vehicle body contour. This is accomplished by having different configurations for the hinge lugs 5 and 6, as shall be explained with reference to FIGS. 3 and 4.

FIGS. 3 and 4 show cross sections of the door pillar taken along the lines and looking into the direction of arrow A—A and B—B of FIG. 2, respectively. As can be seen, the hollow section contains two transverse ridges 18 and 19, which are joined to the outer wall 2 in the region between the slots 3a, 4a and 3b, 4b. The ridges 18 and 19 stiffen the box section. Two lengthwise channels arranged as cage sections 20 and 21 are disposed along the inside surface of wall 2 and are aligned with slots 3a, 3b and 4a, 4b, respectively. The cage walls are formed in part by a ridge 22 of hook-like cross section and may also form a part of the transverse ridges 18 and 19 with molded projections 23, 24, or a portion of one outer wall 25.

Cage nuts 26, 27 and 28, 29 of the fasteners 13, 14 and 15, 16 are arranged in the cage sections 20 and 21 so that they cannot twist. That is, each cage 20, 21 is provided with a width dimension which is sufficiently wide in order to receive the diameter of each of the cage nuts 26–29 (as measured across the flats of each of the cage nuts 26–29) and yet still limit twisting or rotation of the cage nuts within the channels.

The hinge lugs 5 and 6 consist of the base plates 7 and 8, as well as support arms 30, 31 molded thereon. The free ends of each support arm 30, 31 is provided with borehole 32 and 33, respectively, sized for receiving hinge bolts.

The fasteners 13, 14 and 15, 16 are situated at the hinge lugs 5, 6 at the same transverse spacing (indicated at "a") corresponding to the transverse spacing of the slots 3, 4. The support arm 30 of the upper hinge lug 5 lies approximately in the middle at a spacing distance "c" from the center line axis of cage section 21, while the support arm 31 of the lower hinge lug 6 is shifted more to the right indicated by a spacing distance "b". The difference between the spacing distances ("c" and "b") determines the oblique position of the hinge axis 17 with respect to the line of the contour of the door pillar 1a. Each of the support arms 30, 31 have a length indicated at "d" and "e". The lengths "d" and "e" may be of equal length (as illustrated), or may be of unequal length (not shown).

In order to assemble the hinge lugs 5 and 6, the cage nuts 26, 27 and 28, 29 are first inserted within the cage sections 20, 21 from one open side. The height for the door positioning is then adjusted, and the assembly is solidified, for example, by stamping the channel walls or by inserting and tightening the fasteners.

It should be understood that various modifications within the scope of this invention can be made by one of ordinary skill in the art without departing from the spirit thereof. We therefore wish our invention to be defined by the scope of the appended claims as broadly as the prior art will permit, and in view of the specification if need be.

PARTS LIST
1. Hollow Section Members
2. Outer Wall
3. Hole
4. Hole
5. Hinge lugs
6. Hinge lugs
7. Base Plate
8. Base Plate
9. Bore Hole
10. Bore Hole
11. Bore Hole
12. Bore Hole
13. Bolt Fastener
14. Bolt Fastener
15. Bolt Fastener
16. Bolt Fastener
17. Hinge Axis
18. Transverse Ridges
19. Transverse Ridges
20. Cage Section
21. Cage Section
22. Molded Projection
23. Molded Projection
24. Molded Projection
25. Molded Projection
26. Nut
27. Nut
28. Nut
29. Nut
30. Support Arm
31. Support Arm
32. Bolt Recesses
33. Bolt Recesses

We claim:

1. A slanting door pillar assembly in a vehicle coachwork for improved swivel mounting of a vehicle door comprising in operative combination:
   a) an extruded light-metal, hollow-section closed tubular pillar member, slanted from vertical, having a first wall provided with at least two pairs of transversely spaced slots including an upper slot pair and a lower slot pair, each of said slots being disposed parallel to a longitudinal axis of said closed tubular pillar member and having a length which is shorter than a length of said closed tubular pillar member;
   b) a pair of, substantially horizontally oriented hinge lugs including an upper hinge lug and a lower hinge lug adapted for swivel mounting a vehicle door to an outer surface of said first wall of said closed tubular pillar member at heights corresponding to said upper and lower slot pairs respectively, each of said hinge lugs having a base plate provided with a pair of holes having a transverse spacing equal to the transverse spacing of said upper and lower pair of spaced slots of said closed tubular pillar member first wall;
   c) means for fastening the base plates of said upper and lower hinge lugs to said first wall; and
   d) said first wall including means for retaining said fastening means in place prior to tightening to facilitate position adjustment of said hinge lugs and fitting of said vehicle door during assembly.

2. A slanting door pillar assembly as in claim 1 wherein:
   a) said fastening means include a plurality of bolt fasteners; and
   b) said retaining means include a pair of transversely spaced lengthwise channels formed along an inner surface of said closed tubular pillar member first wall adjacent said upper and lower slot pairs, each of said channels defining a cage section sized for accommodating a nut associated with individual ones of said plurality of bolt fasteners.

3. A slanting door pillar assembly as in claim 2 wherein each of said slots in said first wall has a width dimension sufficient to permit transverse adjustment of a bolt fastener received therethrough prior to tightening.

4. A slanting door pillar assembly as in claim 2 wherein:
   a) each of said upper and lower hinge lugs includes a laterally extending support arm having a free end adapted to carry a hinge bolt; and
   b) said support arm of said upper hinge bolt is spaced at a first transverse spacing distance from a longitudinal center-line axis of said closed tubular pillar member, and said support arm of said lower hinge bolt is spaced at a second transverse spacing distance from said longitudinal center-line axis, such that each of said free ends of each said support arms define a hinge axis which lies oblique with respect to said longitudinal center-line axis.

5. A door pillar assembly in a vehicle coachwork for improved swivel mounting of a vehicle door comprising in operative combination:
   a) a substantially vertical, extruded light-metal, hollow-section pillar member having a first wall provided with at least two pairs of transversely spaced holes including an upper hole pair and a lower hole pair, each hole of each said upper and said lower hole pairs is a slot;
   b) a pair of hinge lugs including an upper hinge lug and a lower hinge lug adapted for swivel mounting a vehicle door to an outer surface of said first wall of said pillar member at heights corresponding to said upper and lower hole pairs respectively, each of said hinge lugs having a base plate provided with a pair of holes having a transverse spacing equal to the transverse spacing of said upper and lower pair of spaced slots of said pillar member first wall, each of said slots permitting height adjustment of each said upper and said lower hinge lugs, respectively;
   c) means for fastening the base plates of said upper and lower hinge lugs to said first wall, said fastening means including a plurality of bolt fasteners;
   d) said first wall including means for retaining said fastening means in place prior to tightening to facilitate positioning adjustment of said hinge lugs and fitting of said vehicle door during assembly, said retaining means including a pair of transversely spaced lengthwise channels formed along an inner surface of said pillar member first wall adjacent said upper and said lower hole pairs, each of said channels defining a cage section sized for accommodating a nut associated with individual ones of said plurality of bolt fasteners; and
   e) said pillar member includes a pair of lengthwise ridge members disposed connecting said inner wall surface to an opposed inner wall surface of said hollow-section pillar member, and wherein each of said ridge members is disposed adjacent one of said channels.

6. A door pillar assembly as in claim 5 wherein each of said channels include a pair of upstanding walls each having a laterally inwardly extending end portion, such that each of said channels is C-shaped in cross section, and defines a lengthwise gap having an axis aligned coordinate with a center axis of said bolt fasteners.

7. A door pillar assembly as in claim 5 wherein a portion of at least one of said ridge members forms at least one upstanding wall of one of said channels.

8. A door pillar assembly as in claim 5 wherein each of said slots in said first wall has a width dimension sufficient to permit transverse adjustment of a bolt fastener received therethrough prior to tightening.

9. A door pillar assembly as in claim 5 wherein:
   a) each of said upper and lower hinge lugs includes a laterally extending support arm having a free end adapted to carry a hinge bolt; and
   b) each of said support arms of said upper and lower hinge bolts are spaced at different transverse distances relative to a longitudinal center line axis of said pillar member to define a hinge axis which lies oblique with respect to said longitudinal center line axis of said pillar member.

10. A door pillar assembly as in claim 6 wherein a portion of at least one of said ridge members forms at least one upstanding wall of one of said channels.

11. A door pillar assembly as in claim 6 wherein each of said slots in said first wall has a width dimension sufficient to permit transverse adjustment of a bolt fastener received therethrough prior to tightening.

12. A door pillar assembly as in claim 6 wherein:
   a) each of said upper and lower hinge lugs includes a laterally extending support arm having a free end adapted to carry a hinge bolt; and
   b) each of said support arms of said upper and lower hinge bolts are spaced at different transverse distances relative to a longitudinal center line axis of said pillar member to define a hinge axis which lies oblique with respect to said longitudinal center line axis of said pillar member.

13. A door pillar assembly as in claim 10 wherein:
   a) each of said upper and lower hinge lugs includes a laterally extending support arm having a free end adapted to carry a hinge bolt; and
   b) each of said support arms of said upper and lower hinge bolts are spaced at different transverse distances relative to a longitudinal center line axis of said pillar member to define a hinge axis which lies oblique with respect to said longitudinal center line axis of said pillar member.

14. A door pillar assembly as in claim 10 wherein each of said slots in said first wall has a width dimension sufficient to permit transverse adjustment of a bolt fastener received therethrough prior to tightening.

15. A door pillar assembly as in claim 14 wherein:
   a) each of said upper and lower hinge lugs includes a laterally extending support arm having a free end adapted to carry a hinge bolt; and
   b) each of said support arms of said upper and lower hinge bolts are spaced at different transverse distances relative to a longitudinal center line axis of said pillar member to define a hinge axis which lies oblique with respect to said longitudinal center line axis of said pillar member.

16. A door pillar assembly as in claim 15 wherein the support arms of said upper and lower hinge lugs are of different lengths to permit a desired alignment of said hinge bolts along said hinge axis.

17. A door pillar assembly in a vehicle coachwork for improved swivel mounting of a vehicle door comprising in operative combination:
   a) a substantially vertical, extruded light-metal, hollow-section pillar member having a first wall provided with at least two pairs of transversely spaced holes including an upper hole pair and a lower hole pair;
   b) a pair of hinge lugs including an upper hinge lug and a lower hinge lug adapted for swivel mounting a vehicle door to an outer surface of said first wall of said pillar member at heights corresponding to said upper and lower hole pairs respectively, each of said hinge lugs having a base plate provided with a pair of holes having a transverse spacing equal to the transverse spacing of said upper and said lower pair of spaced holes of said pillar member first wall;
   c) means for fastening the base plates of said upper and lower hinge lugs to said first wall, said fastening means including a plurality of bolt fasteners;
   d) said first wall including means for retaining said fastening means in place prior to tightening to facilitate positioning adjustment of said hinge lugs and fitting of said vehicle door during assembly, said retaining means including a pair of transversely spaced lengthwise channels formed along an inner surface of said pillar member first wall adjacent said upper and said lower hole pairs, each of said channels defining a cage section sized for accommodating a nut associated with individual ones of said plurality of bolt fasteners; and e) said pillar member includes a pair of lengthwise ridge members disposed connecting said inner wall surface to an opposed inner wall surface of said hollow-section pillar member, and wherein each of said ridge member is disposed adjacent one of said channels.

18. A door pillar assembly as in claim 17 wherein each said channels include a pair of upstanding walls each having a laterally inwardly extending end portion, such that each of said channels is C-shaped in cross section, and defines a lengthwise gap having an axis aligned coordinate with a center axis of said bolt fasteners.

19. A door pillar assembly as in claim 17 wherein each of said holes of said upper and lower hole pair in said first wall has a diameter dimension sufficient to permit transverse adjustment of a bolt fastener received therethrough prior to tightening.

20. A door pillar assembly as in claim 17 wherein:

a) each of said upper and lower hinge lugs includes a laterally extending support arm having a free end adapted to carry a hinge bolt; and b) each of said support arms of said upper and lower hinge bolts are spaced at different transverse distances relative to a longitudinal center line axis of said pillar member to define a hinge axis which lies oblique with respect to said longitudinal center line axis of said pillar member.

* * * * *